United States Patent
Cristo

(10) Patent No.: US 8,207,625 B1
(45) Date of Patent: Jun. 26, 2012

(54) ELECTRICAL POWER GENERATING ARRANGEMENT

(76) Inventor: Constantine Gus Cristo, Valley Center, CA (US)

( * ) Notice: Subject to any disclaimer, the term of this patent is extended or adjusted under 35 U.S.C. 154(b) by 446 days.

(21) Appl. No.: 12/586,714

(22) Filed: Sep. 28, 2009

(51) Int. Cl.
*F03D 9/00* (2006.01)
*H02P 9/04* (2006.01)

(52) U.S. Cl. .......................................................... 290/55
(58) Field of Classification Search .................... 290/43, 290/44, 54, 55
See application file for complete search history.

(56) References Cited

U.S. PATENT DOCUMENTS

| | | | |
|---|---|---|---|
| 4,403,916 A | 9/1983 | Skelskey | 416/14 |
| 4,648,801 A | 3/1987 | Wilson | 416/171 |
| 5,133,637 A | 7/1992 | Wadsworth | 415/44 |
| 6,452,287 B1 | 9/2002 | Looker | 290/55 |
| 7,425,776 B2 | 9/2008 | Ketcham | 290/55 |
| 7,431,567 B1 | 10/2008 | Bevington et al. | 416/244 R |
| 7,438,533 B2 | 10/2008 | Eyb et al. | 416/230 |
| 7,932,621 B1* | 4/2011 | Spellman | 307/2 |
| 2007/0151385 A1 | 7/2007 | Kinzer | 74/473.21 |
| 2008/0131273 A1 | 6/2008 | Fuller | 415/203 |
| 2008/0181771 A1 | 7/2008 | Papp | 15/208.1 |
| 2008/0184990 A1 | 8/2008 | Tuchelt | 126/684 |
| 2008/0207389 A1 | 8/2008 | Fahrenbach et al. | 475/344 |
| 2008/0211234 A1 | 9/2008 | Grassi | 290/55 |
| 2008/0217925 A1 | 9/2008 | Boone et al. | 190/55 |
| 2008/0253889 A1 | 10/2008 | Krivcov et al. | 416/44 |
| 2008/0258469 A1 | 10/2008 | Stephens et al. | 290/55 |
| 2008/0258473 A1 | 10/2008 | McMaster | 290/4 R |
| 2008/0260514 A1 | 10/2008 | Nielsen et al. | 415/4.3 |
| 2008/0260532 A1 | 10/2008 | Luethi | 416/51 |

* cited by examiner

*Primary Examiner* — Javaid Nasri
(74) *Attorney, Agent, or Firm* — Don Finkelstein

(57) ABSTRACT

A wind turbine connected to an electrical generator and the turbine and electrical generator contained in inner tubular tower in which wind driven air flows downwardly in the inner tubular tower to drive the turbine and the air flow is directed to flow upwardly in the space between the inner tubular tower and an outer tubular tower in which the inner tubular tower is mounted to thereby provide a chimney effect.

14 Claims, 5 Drawing Sheets

ELECTRICAL POWER GENERATING ARRANGEMENT

BACKGROUND OF THE INVENTION

1. Field of the Invention

This invention relates to the electrical power generating art and more particularly to an improved structural arrangement for generating electrical power utilizing both wind energy and solar energy.

2. Description of the Prior Art

Many structural devices have heretofore been proposed and/or utilized to provide the generation of electrical energy utilizing wind power to drive the devices commonly called wind turbines, often erected in multiple installations generally called wind farms. The wind farms are generally situated in a geographical area previously determined to be an area where there is generally windy conditions. In such devices there is usually provided a three bladed propeller like device rotatably mounted on the top of a vertically aligned tower where the propeller may axially rotate to always be facing the prevailing wind. The towers may be on the order of fifty to seventy five feet in axial length from the top, where the propeller like devices are mounted, to the bottom thereof located at the ground surface. In some proposed earlier models of wind turbine arrangements, the propeller like devices were connected to and rotated around a horizontally oriented shaft. The horizontally oriented shaft was often connected through a gear box to rotate a vertical shaft extending the axial length of the tower and the vertical shaft in turn was connected to an electrical generator usually located at the bottom of the tower. As the wind rotated the propeller like devices the electrical generator generates electricity which was fed into a power grid or other type of system. Such arrangements of wind turbines have not proven to be operationally satisfactory since, for example, the elongated vertical drive shaft was difficult to maintain in proper alignment.

Many of the later models of wind turbines incorporated the electrical generator and often a gear box in a close coupled arrangement to the rotating propeller blades at the top of the tower to which they were attached. Such an arrangement results in a very heavy mass and structure at the top of the tower thereby requiring comparatively heavy tower structures to support such heavy masses. Also, there are difficult maintenance activities associated with the massive rotating parts at the top of the towers which often resulted in down time for the wind turbine.

While some of the wind turbines incorporated propeller like devices in a generally fixed orientation to the direction of the expected wind, they are often rotated at a very low speed or not rotated at all for the condition of the wind blowing from a direction different from the expected direction and thus minimum or no electrical energy is generated for such conditions. Other wind turbine arrangements incorporated a rotatable structure at the top of the tower to allow rotation of the assembly of one or more of the propeller blades, gear box and electrical generator about a vertical axis so that the blades could be oriented in the direction of the wind. However, the weight of the structure to be rotated into the wind often required the use of a sensor to detect the direction of the wind and a motor, generally electrically powered, to rotate the desired structure in response to the detected direction of the wind as a simple weather vane type device of reasonable size could not generate enough force to rotate the assembly.

In other prior art wind turbine systems there have been proposed vertically oriented rotor assemblies to drive a vertical shaft but such devices have not proven to be commercially acceptable or practical in operation.

Since the wind turbines are generally located outdoors, the solar rays from the sun impinge on the tower structure supporting the propeller like devices but this energy available from the solar rays has not heretofore been utilized to increase the efficiency of the electrical energy generation.

Thus, there has long been a need for a wind driven structure for driving an electrical generator to provide electrical energy that will automatically respond to any changing direction of the wind to allow full power operation of the system as well as utilizing the energy from solar rays to aid in the generation of the electrical energy. There has also been a need for a wind turbine arrangement that is free of massive weights at the top of the supporting tower and that is free of lengthy rotating shafts. It has also been desired to have a wind turbine arrangement in which the routine service to the main structural members of the tower assembly such as the wind turbine, gear box and electric generator may be accomplished at ground level.

Accordingly, it is an object of the present invention to provide an improved wind turbine arrangement for generating electrical energy.

It is another object of the present invention to provide an improved wind turbine arrangement for generating electrical energy that operates at substantially full power regardless of the direction of the wind.

It is another object of the present invention to provide an improved wind turbine arrangement for generating electrical energy regardless of the direction of the wind and which utilizes energy from solar rays to improve the efficiency of the electrical energy generation.

SUMMARY OF THE INVENTION

The above and other objects of the present invention are achieved, in a preferred embodiment thereof by providing an elongated outer tubular tower having an outer wall surface and an inner wall surface. The outer tubular tower has an open top end which is located a predetermined distance above the ground level and a closed bottom end located in regions adjacent the ground level upon which the outer tubular tower is secured. The securing of the outer tubular tower to the ground may be by providing a plurality of supporting guy wires or the tower may be self supporting depending on the height of the tower and the weight of the tower and the forces to which the tower may be exposed during operation. In preferred embodiments of the present invention the outer tubular tower is generally cylindrical about a vertically extending axis. However, in other embodiments of the present invention the outer tubular tower may be of other geometrical shapes as selected for particular applications.

An elongated inner tubular tower is generally concentrically positioned within the outer tubular tower and the inner tubular tower has an outer surface radially spaced a preselected distance from the inner surface of the of the outer tubular tower to define a first airflow passage therebetween. The inner tubular tower also has an inner surface and the height of the inner tubular tower is substantially coextensive with the height of the outer tubular tower and in preferred embodiments of the present invention, the open top of the inner tubular tower may extend a preselected distance above the open top end of the outer tubular tower. The inner tubular tower is also generally cylindrical and is concentric about the vertically extending axis. However, in other embodiments of the present invention the inner tubular tower may be of other geometrical shapes as selected for particular applications.

The inner tubular tower has a top end in regions adjacent and preferably spaced a preselected distance above the top end of the outer tubular tower The inner tubular tower has a bottom end in regions adjacent the bottom end of the outer tubular tower.

The inner surface of the inner tubular tower provides a second airflow passage. The second airflow passage provides airflow flowing downwardly from regions adjacent the top end of the inner tubular tower toward the bottom end of the inner tubular tower. The bottom end of the inner tubular tower has a venturi forming member positioned therein to define a venturi throat and an impulse turbine is located in regions adjacent the throat of the venturi in the inner tubular tower to receive the downwardly flowing air therein. The impulse turbine is connected to the input of a gear box and an electric generator is connected to the output of the gear box. The speed differential between the rotating speed of the impulse turbine and the desired rotational speed of the electric generator is provided by the gear box so that the electric generator will operate at the most efficient speed thereof.

An air inlet duct is pivotally mounted on the top end of the inner tubular tower and spaced above the top end of the outer tubular tower preferably a sufficient distance so that the air flowing out of the top end of the outer tubular tower does not interfere with the with air flow into the air inlet duct at the top end of inner tubular tower. The air inlet duct has an inlet mouth portion generally opening in the horizontal direction and oriented to receive air as blown therein by the wind. The inlet air duct also has a transfer portion connected to the inlet mouth portion of the air inlet duct. The transfer portion receives the flowing air from the inlet mouth portion and redirects the flowing air to a vertical direction to flow downwardly into the second airflow passage defined by the inner surface of the inner tubular tower.

The pivotal connection between the air inlet duct and the inner tubular tower is provided by a ball bearing, needle bearing, tapered bearing or any other type of bearing suitable for the purpose. The inlet mouth portion of the inlet air duct is preferably a bell mouth so as to reduce the drag on the inlet air flowing therein. As noted above, the inlet mouth portion is preferably oriented in the horizontal direction so that the blowing wind will force air into the inlet mouth portion. As set forth above, after flowing through the horizontally oriented inlet mouth portion of the air inlet duct the air flows into the transfer portion which redirects the flowing air to flow vertically downwardly in the second air flow passage. The downwardly flowing air enters the venturi section of the second air flow passage defined by the inner surface of the inner tubular tower. In the venturi section of the second air flow passage the velocity of the air is increased by the venturi. The speeded up air flows into an impulse turbine to cause the rotation thereof. The rotation of the impulse turbine rotates the input shaft of the gear box to cause rotation of the output shaft of the gear box and thus rotates the electric generator to cause the generation of electrical energy. The electric energy thus generated may be connected to a power grid, to an individual residence or to any other desired structure requiring electric energy.

After flowing through the impulse impeller turbine, the flowing air is directed over the gear box and the electric generator to provide cooling thereof. The outer tubular tower is provided with a generally donut shaped base at the bottom end for receiving the air flowing downwardly in the second air flow passage and redirects the flowing air to flow upwardly in the first airflow passage defined by the outer surface of the inner tubular tower and the inner surface of the outer tubular tower. The air flows upwardly in the first airflow passage and is vented to the atmosphere at the open top end of the outer tubular tower.

Solar radiation is incident upon the outer surface of the outer tubular tower and thereby heats the outer tubular tower to thus heat the air flowing upwardly in the first air flow passage to provide a chimney effect. In order to increase the chimney effect, it has been found to be advantageous to coat the outer surface of the outer tubular tower with a thermal radiation heat absorbing coating which transfers the heat energy to the air flowing upwardly in the first airflow passage. Heating of the up-flowing air increases the velocity of the air flow and provides an enhanced chimney effect to thereby increase the velocity of the air flowing downwardly in the second air flow passage and over the impulse impeller turbine. The increased velocity of the air provides more energy and thereby increases the efficiency of the generation of the electrical energy. In preferred embodiments of the present invention the thermal radiation heat absorbing coating outer surface of the outer tubular tower may be, for example, black paint or any other coating suitable for the purpose to provide the absorption of the solar radiation.

In some applications it has been found advantageous to coat the outer surface of the inner tubular tower with a thermally insulating coating to minimize the transfer of heat from the air flowing upwardly in the second air flow passage to the inner tubular member and/or the air flowing downwardly in the second air flow passage thus maximizing the heat retained in the air flowing upwardly in the first air flow passage for increased chimney effect.

One or more doors or other access structures may be provided in the outer tubular member and the inner tubular member in regions adjacent to the bottom ends thereof to allow access to the venturi structure, the turbine, the gear box and the generator so that routine or emergency maintenance thereof may be conveniently conducted at or near the ground level upon which the wind driven electrical energy generating structure of the present invention rests.

BRIEF DESCRIPTION OF THE DRAWING

The above and other embodiments of the present invention may be more fully understood from the following detailed description taken together with the accompanying drawing wherein similar reference characters refer to similar elements throughout and in which.

DESCRIPTION OF THE PREFERRED EMBODIMENTS

Figure 1:
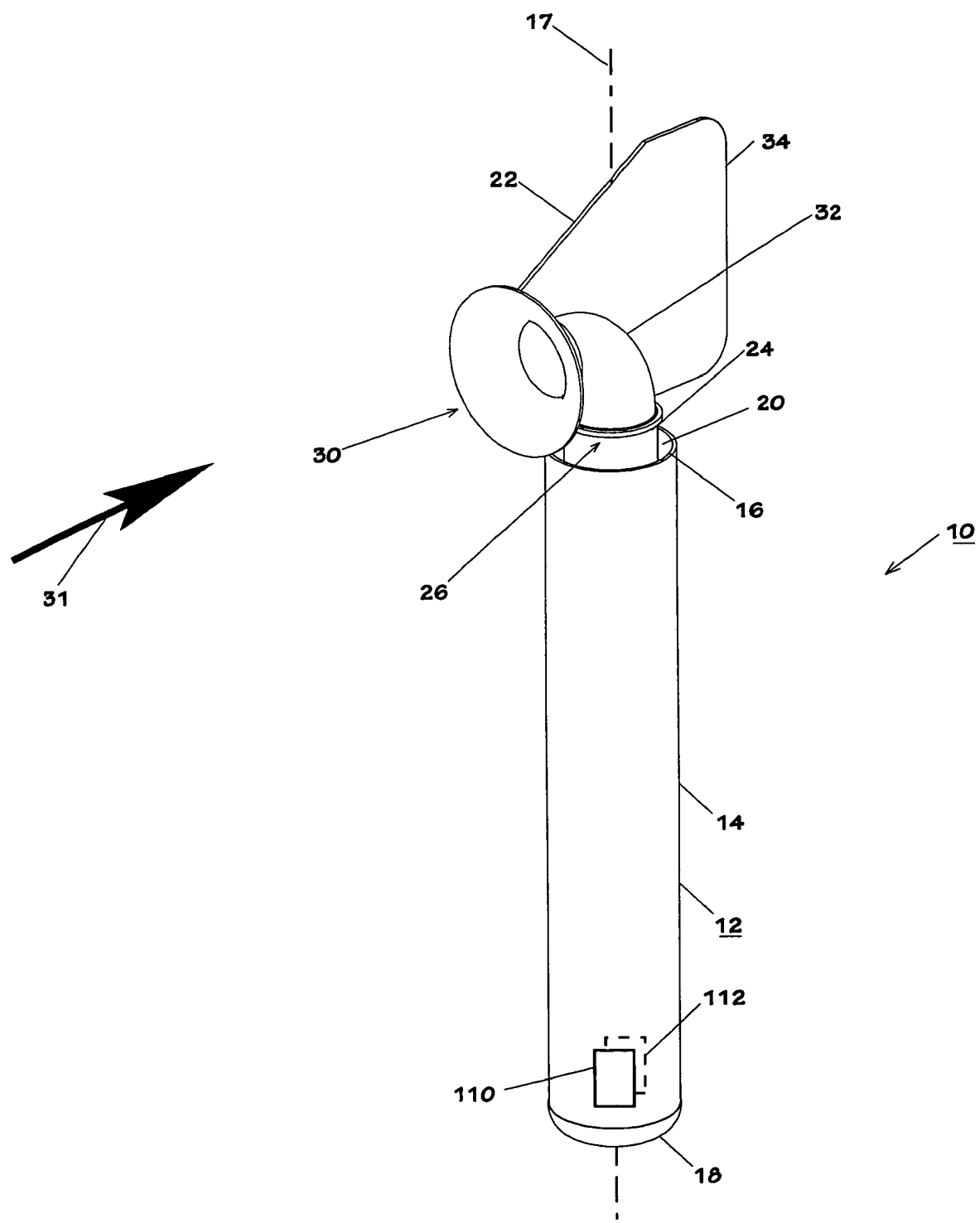
FIG. 1 illustrates a perspective view of a preferred embodiment of the wind driven electrical energy generating structure of the present invention.

Referring now to the drawing, there is illustrated a preferred embodiment generally designated 10 of a wind driven electrical energy generating structure 12 according to the principals of the present invention. As shown on FIG. 1, the wind driven electrical energy generating structure 12 has an elongated outer tubular tower 14 having a vertically oriented axis 17. The outer tubular tower 14 has an open top end 16 and a closed bottom end 18. An elongated inner tubular tower 20 is concentrically mounted in the outer tubular tower 14 about the axis 17. The inner tubular tower has an open top end 24 and in preferred embodiments of the present invention the top end 24 of the inner tubular tower is spaced vertically above the open top end 16 of the outer tubular tower 14 by a distance D (FIG. 2) selected so that the air exiting the open top end 16 of the outer tubular tower 14 does not interfere with the flow of air into the air inlet duct member 22.

An air inlet duct member 22 is pivotally mounted by a bearing member 26 on the top end 24 of the inner tubular tower 20 for rotation of the air inlet duct 22 about the axis 17. The air inlet duct member 22 has an inlet mouth portion 30 generally opening in the horizontal direction indicated by the arrow 31 which is the anticipated direction of the prevailing wind in the vicinity of the wind driven electrical energy generating structure 12. The angular relationship of the inlet mouth portion 30 with respect to the horizontal may be selected based on the particular wind conditions at the location of the wind driven electrical energy generating structure 12. The inlet mouth portion 30 is preferably a bell mouth configuration to reduce the drag thereon and provide more efficient flow of the air into the inlet mouth portion 30. The inlet air duct 22 also has a transfer portion 32 which receives the wind driven air from the inlet mouth portion 30 and directs the air into the interior of the inner tubular tower 20 to flow downwardly therein generally in the direction of the axis 17.

The air inlet duct member 22 also has a "weather vane" member 34 which orients the inlet mouth portion 30 into the direction of the prevailing wind.

Figure 2:
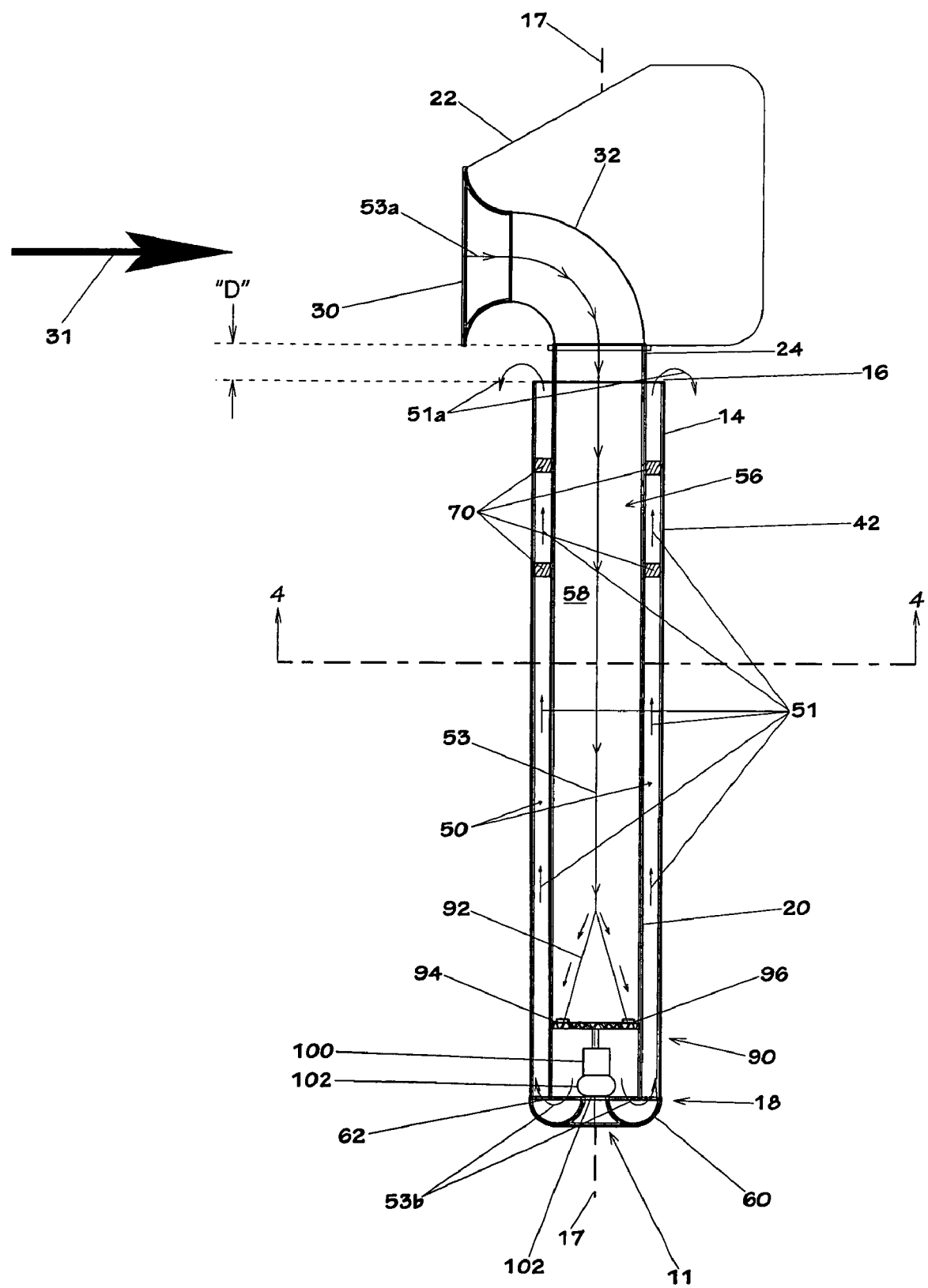
FIG. 2 is a partial sectional view of the wind driven electrical energy generating structure shown in FIG. 1.
Figure 3:
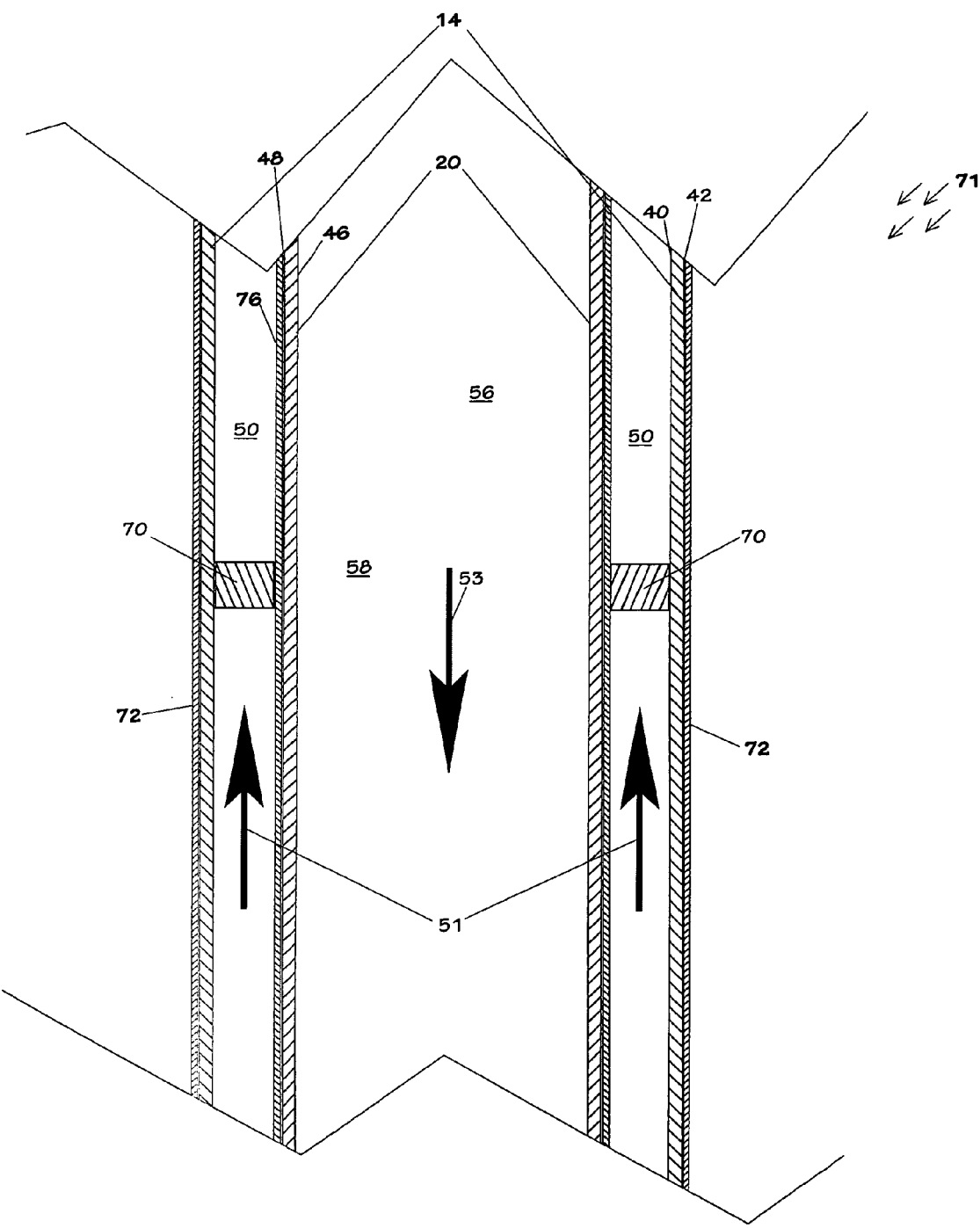
FIG. 3 is a partial sectional view of a portion of the wind driven electrical energy generating structure of the present invention.
Figure 4:
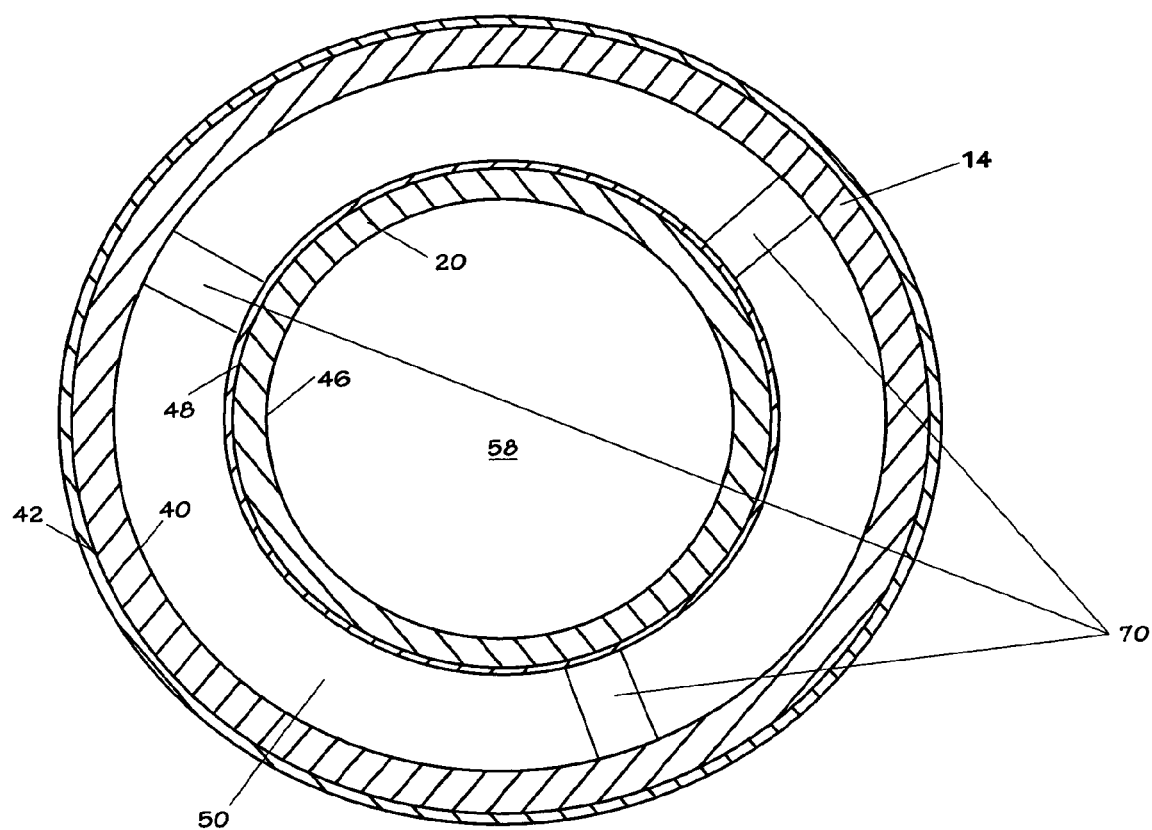
FIG. 4 is a partial sectional view along the line 4-4 of FIG. 2.

As shown most clearly on FIGS. 2, 3 and 4, the outer tubular tower 14 has an inner surface 40 and an outer surface 42. The inner tubular tower 20 has an inner surface 46 and an outer surface 48. the outer surface 48 of the inner tubular tower 20 is spaced radially inward from the inner surface 40 of the outer tubular tower 14 to define a first airflow passage 50 therebetween and as described below in greater detail, air flows upwardly in the direction of the arrow 51 in the first airflow passage 50 to exit the first airflow passage 50 at the open top 16 of the outer tubular tower 14 as indicated by the arrows 51a.

As described above, wind driven air flows into the air inlet duct 22 as indicated at arrow 53a and flows into and downwardly in the interior 56 of the inner tubular tower 20 as indicated by the arrows 53 and the interior 56 of the inner tubular tower 20 defines a second air flow passage 58 in which the air flows downwardly as shown by the arrows 53. The closed bottom end 18 of the outer tubular tower 14 is provided with a donut shaped end cap 60 which is generally in the form of a bundt cake pan. The downwardly flowing air indicated by the arrow 53 in the second air flow passage 58 exits the open end 62 of the inner tubular tower 20 and is directed to flow upwardly in the first airflow passage 50 as indicated at the arrows 53b by the configuration of the end cap 60.

As shown most clearly in FIGS. 3 and 4, a plurality of axially spaced apart support blocks 70 may be provided as desired to provide support between the inner tubular tower 20 and the outer tubular tower 14.

In some applications of the present invention it may be desired to increase the energy of the air flowing downwardly in the first airflow passage 50. It has been found that with solar radiation indicated by the arrow 71 incident on the outer surface of the outer tubular tower 14, a thermal heat absorbing coating indicated at 72 may be applied thereto so that thermal energy is transferred to the air flowing in the first airflow passage 50. Such addition of thermal energy adds to the chimney effect provided by the air flowing upwardly in the first air flow passage 50. In order to retain as much thermal energy in the air flowing in the first air flow passage 50, it has been desirable in some applications of the present invention to provide a thermally insulating coat indicated at 76 on the outer surface 48 of the inner tubular tower 20.

Figure 5:
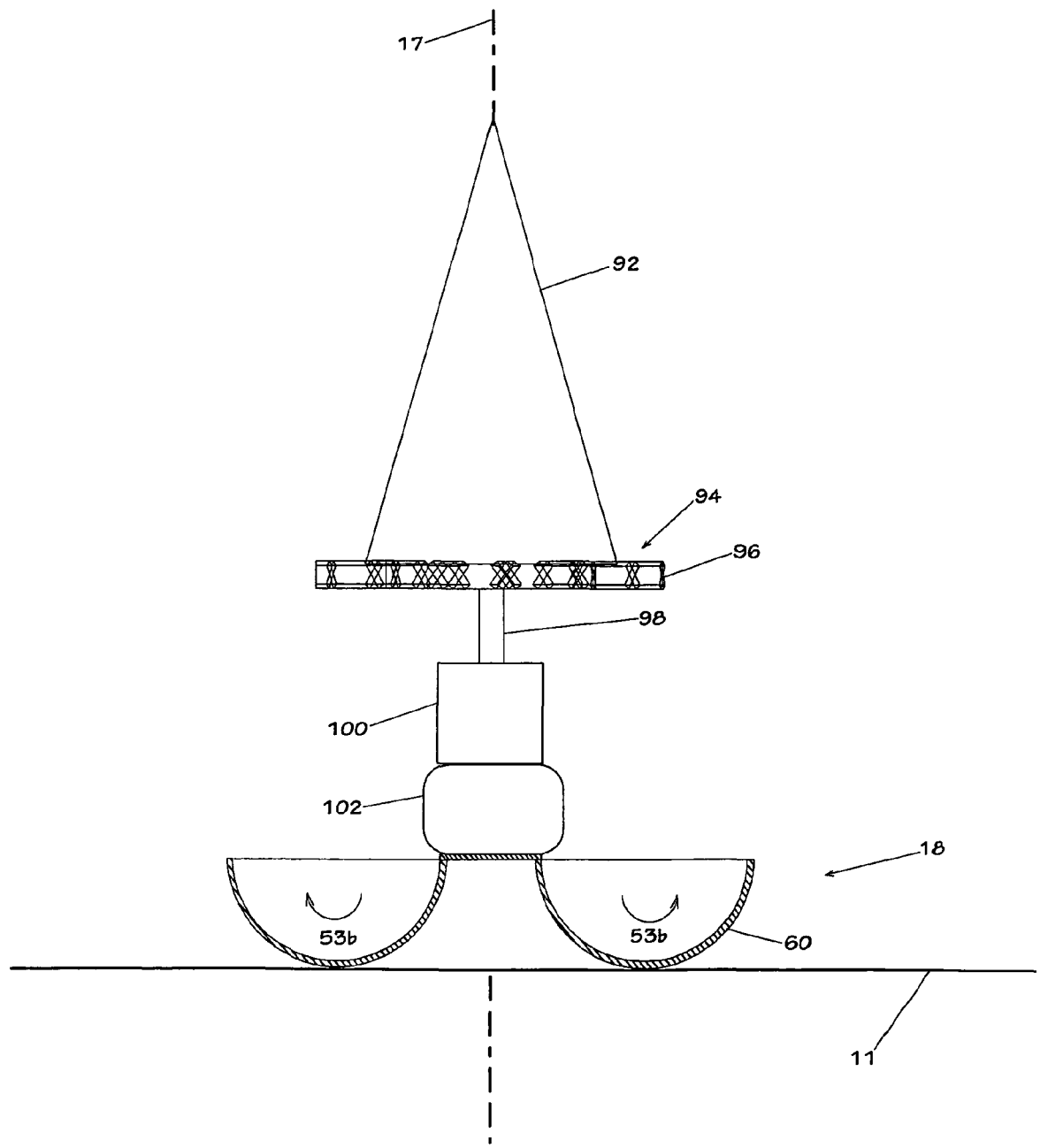
FIG. 5 is a partial schematic detailed view of a venturi section and outer tubular tower base of the wind driven electrical energy generating structure of the present invention.

The kinetic energy of the air flow in the second air flow passage 58 is utilized to drive an impulse turbine located in the venturi section indicated at 90 on FIG. 2 and shown in detail on FIG. 5. In order to increase the velocity of the air flow in the second air flow passage 58, a venturi is formed by the conical member 92 so at the throat 94 of the venturi the velocity of the airflow is maximized. An impulse turbine 96 is located at or near the throat 94 of the venturi and is driven to rotate about the axis 17. The impulse turbine 96 is connected to the input shaft 98 of a gear box 100 and the gear box 100 is connected to an electric generator 102. The gear box 100 drives the electric generator 102 at the desired most efficient rotational speed thereof.

The electricity generated by the electric generator 102 may be fed into a power grid or to an individual location such as a residence, a commercial or industrial site or the like. The wind driven electrical energy generating structure 12 may be free standing on the surface of the ground 11 as shown in the drawing or may be supported by guy wires or the like (not shown). That is, for smaller towers which in some applications may be on the order of thirty feet to fifty feet in height, depending on the environmental conditions, the towers may be free standing. In other applications, the towers may be on the order of three hundred feet to five hundred feet in height and such towers generally will require guy wires for proper support.

An access door such as access door 110 (FIG. 1) may be provided in the outer tubular tower 14, And a similar door 112 in the inner tubular tower 20 in regions of the wind driven electrical energy generating structure 12 adjacent the venturi section 90 near the ground level 11 upon which the wind driven electrical energy generating structure 12 is supported to allow convenient access to the venturi section for routine service and/or maintenance of the impulse turbine 96, gear box 100, electrical generator 102 or any other portion therein.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. An improved wind driven electrical energy generating arrangement comprising, in combination:

an elongated outer tubular tower having an open top end, a closed bottom end, an inner surface and an outer surface, and having an axis along the elongated length thereof, said elongated outer tubular tower positionable with said axis in a vertical orientation;

an elongated internal tubular tower positioned in said interior volume of said outer tubular tower and said elongated internal tubular tower substantially concentrically mounted in said elongated outer tubular tower about said axis, and said elongated internal tubular tower having an outer surface radially spaced inwardly from said inner surface of said elongated outer tubular tower to define a first air flow passage therebetween, and an inner surface, and said elongated internal tubular tower having an open top end in regions adjacent said open top end of said elongated outer tubular tower, and a bottom end in regions adjacent to said bottom end of said elongated outer tubular tower, and said inner surface of said elongated inner tubular tower defining a second airflow passage;

an air inlet duct member mounted on said top end of said inner tubular tower for pivotal rotation with respect to said elongated inner tubular tower for directing air into said second air flow passage, to flow axially downwardly therein;

a generally conical member in said second airflow passage in regions adjacent and spaced from said bottom end of said inner tower and aligned substantially co-axially along said axis and having a small upper end and a large bottom end to define a venturi section having a venturi throat portion of said inner tower an air driven impulse impeller turbine mounted for rotational movement in said elongated inner tubular tower at said venturi throat and said impulse impeller turbine rotated by airflow in said second airflow passage and rotating an output shaft;

a gear box having an input gear shaft connected to said output shaft of said impulse turbine, and an output gear shaft;

an electric generator connected to said output gear shaft of said gear box and adapted to be driven thereby for generating electrical energy.

2. The arrangement defined in claim 1 and further comprising:
a solar radiation absorbing coating on said outer surface of said outer tubular tower for absorbing solar radiation incident thereon for heating said outer tubular tower to thereby heat air flowing in said first airflow passage.

3. The arrangement defined in claim 2 and further comprising:
a thermal insulating coating on said outer surface of said inner tower.

4. The arrangement defined in claim 2 and further comprising:
a thermally insulating coating on said outer surface of said inner tower;
a wind directional vane member mounted on said air inlet duct member for orienting said inlet mount of said air inlet duct member into substantially the direction of wind.

5. The arrangement defined in claim 4 and further comprising:
a plurality of spacer member between said outer surface of said inner tower and said inner surface of said outer tower to support said inner tower.

6. The arrangement defined in claim 1 and further comprising:
a wind directional vane member mounted on said air inlet duct member for orienting said inlet mouth of said inlet duct member into substantially the direction of wind.

7. The arrangement defined in claim 1 and wherein:
air flow at said top end of said inner tower has a first velocity for a predetermined velocity of the wind and the airflow at said throat of said venturi section of said inner tower has a second velocity greater than said first velocity.

8. The arrangement defined in claim 1 wherein:
said bottom end of said inner tower is vertically spaced above said bottom end of said outer tower to provide an air flow transition passage from said second airflow passage into said first airflow passage, whereby air flows downwardly in said second airflow passage, through said air flow transition passage and upwardly in said first airflow passage.

9. The arrangement defined in claim 1 and further comprising:
a plurality of spacer member between said outer surface of said inner tower and said inner surface of said outer tower to support said inner tower.

10. The arrangement defined in claim 9 and further comprising:
a solar radiation absorbing coating on said outer surface of said outer tubular tower for absorbing solar radiation incident thereon for heating said outer tubular tower to thereby heat air flowing in said first airflow passage;
a thermal insulating coating on said outer surface of said inner tower.

11. An improved wind driven electrical energy generating arrangement comprising, in combination:
an outer tubular tower having a top end and a bottom end;
an inner tubular tower having a top end in regions adjacent said top end of said outer tubular tower and a bottom end in regions adjacent said bottom end of said outer tubular tower and coaxially aligned with and spaced radially inwardly from said outer tubular tower to define a first, upwardly flowing airflow passage therebetween, and said inner tubular tower defining a second, downwardly flowing airflow passage therein;
a bundt cake pan configured member connected to said bottom end of said outer cylindrical tower for directing the flow of air from said second airflow passage to said first airflow passage;
an impulse turbine in said second airflow passage, and said impulse turbine operatively connected to an electrical generator,
whereby airflow in said second airflow passage drives said impulse turbine to drive said electrical generator and airflow in said first airflow passage provides a chimney effect to induce greater airflow velocity in said first airflow passage.

12. The arrangement defined in claim 11 and further comprising:
a solar radiation absorbing coating on said outer tubular tower to provide heating to airflow in said first airflow passage.

13. The arrangement defined in claim 12 and further comprising:
a thermal insulating coating on said inner tubular tower to block the flow of thermal energy from the air in said first airflow to said inner tubular tower.

14. The arrangement defined in claim 13 wherein:
said top end of said outer tubular tower is open and said bottom end of said outer tubular tower is closed by said bundt cake configured member;
said top end of said inner tubular tower is open and said bottom end of said inner tubular tower is open, and further comprising:
an air inlet duct mounted on said top end of said inner tubular tower for receiving wind driven air therein and directing the wind driven air into said second air flow passage.

* * * * *